(12) United States Patent
Pu

(10) Patent No.: US 12,490,710 B1
(45) Date of Patent: Dec. 9, 2025

(54) VEHICLE PET PAD

(71) Applicant: Zhixiang Pu, Guangdong (CN)

(72) Inventor: Zhixiang Pu, Guangdong (CN)

( * ) Notice: Subject to any disclaimer, the term of this patent is extended or adjusted under 35 U.S.C. 154(b) by 0 days.

(21) Appl. No.: 19/169,037

(22) Filed: Apr. 3, 2025

(51) Int. Cl.
*A01K 1/02* (2006.01)
*A01K 1/015* (2006.01)
*B60N 3/04* (2006.01)

(52) U.S. Cl.
CPC .......... *A01K 1/0272* (2013.01); *A01K 1/0157* (2013.01); *B60N 3/044* (2013.01); *B60N 3/046* (2013.01)

(58) Field of Classification Search
CPC .. A01K 1/0272; A01K 1/0157; A01K 1/0236; A01K 1/0254; A01K 1/0353; B60N 3/044; B60N 3/046
See application file for complete search history.

(56) References Cited

U.S. PATENT DOCUMENTS

| | | | | |
|---|---|---|---|---|
| 4,943,105 A * | 7/1990 | Kacar | ................ | B60N 2/2854 |
| | | | | 297/229 |
| 5,133,294 A * | 7/1992 | Reid | ................ | A01K 1/0272 |
| | | | | 119/771 |
| RE47,524 E * | 7/2019 | Pietra | ................ | A01K 1/0272 |
| 2005/0253444 A1 * | 11/2005 | Godshaw | ............ | B60N 2/6009 |
| | | | | 297/452.12 |
| 2008/0156275 A1 * | 7/2008 | Lam | ................ | A01K 1/0353 |
| | | | | 119/497 |
| 2009/0126638 A1 * | 5/2009 | Bennett | ................ | B60N 2/4221 |
| | | | | 119/28.5 |
| 2010/0288204 A1 * | 11/2010 | Costello | ............... | A01K 1/0272 |
| | | | | 119/453 |
| 2011/0197823 A1 * | 8/2011 | Pietra | ................ | A01K 1/0353 |
| | | | | 119/497 |
| 2013/0125827 A1 * | 5/2013 | Pietra | ................ | A01K 1/0353 |
| | | | | 119/496 |
| 2014/0102377 A1 * | 4/2014 | Hoffman | ............ | A01K 1/0272 |
| | | | | 119/496 |
| 2021/0392848 A1 * | 12/2021 | Templeton | ............. | B60R 22/16 |
| 2022/0322633 A1 * | 10/2022 | Glover | ............... | A01K 1/0125 |
| 2023/0263128 A1 * | 8/2023 | Zhen | ................ | A01K 1/0272 |
| | | | | 119/496 |
| 2025/0072388 A1 * | 3/2025 | Kordecki | ............ | A01K 1/0272 |

FOREIGN PATENT DOCUMENTS

KR 20230125558 A * 8/2023 ............. A01K 1/029

* cited by examiner

*Primary Examiner* — Trinh T Nguyen

(57) ABSTRACT

A vehicle pet pad includes a first pad and a second pad. The first pad includes a base pad, a first side pad, and a second side pad. The first side pad and the second side pad are bendable and capable of forming an enclosure structure which is U-shaped or approximately U-shaped. The enclosure structure includes a first side edge, a second side edge, and a third side edge. The first side edge, the second side edge, and the third side edge cooperatively define a first edge opening. The second pad is arranged on one of the first side edge, the second side edge, and the third side edge, and detachably connected to another one or two of the first side edge, the second side edge, and the third side edge. The second pad includes a first rigid pad.

19 Claims, 8 Drawing Sheets

VEHICLE PET PAD

FIELD

The present disclosure relates to the field of automotive accessories, and particularly to a vehicle pet pad.

BACKGROUND

In related art, vehicle pet pads typically include two pads disposed near left and right vehicle doors to confine pets within the pad. However, the vehicle pet pads are mostly made of soft materials and lack sufficient support. To prevent the pads from collapsing during use, the pads are often secured to door handles with straps, which makes it inconvenient for pets to enter or exit, and the straps may obstruct the pet's view of the scenery outside the vehicle window.

Therefore, there is a need to improve the vehicle pet pads in the related art to address the above-mentioned drawbacks.

SUMMARY

The present disclosure provides a vehicle pet pad. The vehicle pet pad includes a first pad and a second pad. The first pad includes a base pad, a first side pad, and a second side pad. Each of the first side pad and the second side pad is bendable relative to the base pad, and the first side pad, the second side pad, and the base pad are capable of forming an enclosure structure which is U-shaped or approximately U-shaped. The enclosure structure includes a first side edge, a second side edge, and a third side edge, the first side edge, the second side edge, and the third side edge cooperatively define a first edge opening. The second pad is arranged on one of the first side edge, the second side edge, and the third side edge, detachably connected to another one or two of the first side edge, the second side edge, and the third side edge, configured to cover or open the first edge opening, and including a first rigid pad.

REFERENCE NUMERALS IN THE DRAWINGS

Figure 1:
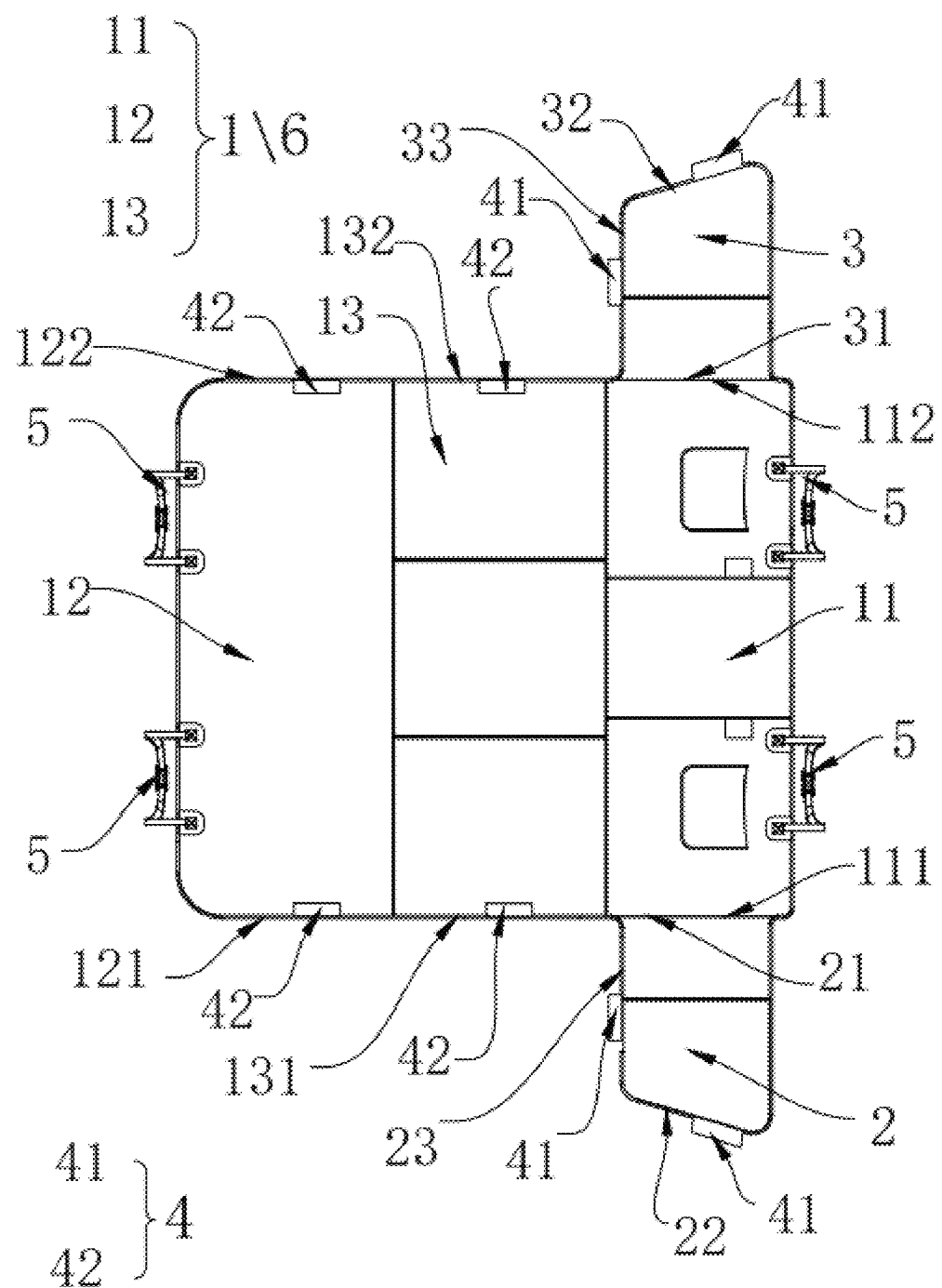
FIG. 1 is a structural view of a vehicle pet pad in a flat state according to embodiments of the present disclosure.

1—first pad; 11—first side pad; 111—first side edge; 112—fourth side edge; 12—second side pad; 121—second side edge; 122—fifth side edge; 13—base pad; 131—third side edge; 132—sixth side edge; 2—second pad; 21—first edge; 22—second edge; 23—third edge; 3—third pad; 31—fourth edge; 32—fifth edge; 33—sixth edge; 4—connection structure; 41—first connector; 42—second connector; 5—strap; 6—enclosure structure; 7—first edge opening; 8—second edge opening; 91—first pad cloth; 92—second pad cloth; 93—third pad cloth; 94—fourth pad cloth; 95—fifth pad cloth; 101—first rigid pad; 102—second rigid pad; 103—third rigid pad.

DETAILED DESCRIPTION

To make the above objectives, features, and advantages of the present disclosure more comprehensible, the following provides a detailed description of specific embodiments of the present disclosure with reference to the accompanying drawings.

It should be noted that the terms "first", "second", etc., in the description and claims of the present disclosure and the above drawings are used to distinguish similar objects and do not necessarily imply a specific order or sequence. It should be understood that such terms may be interchangeable under appropriate circumstances, so that the embodiments of the present disclosure described herein can be implemented in orders other than those illustrated or described.

In the description of the present disclosure, unless otherwise specified or limited, the terms "arranged", "installed", "connected", and "coupled" should be interpreted broadly. For example, a connection may be fixed, detachable, or integral; it may be mechanical or achieved through an intermediate medium. The specific meanings of these terms in the present disclosure can be understood by those skilled in the art based on the context.

In the description of the present disclosure, references to terms such as "embodiment", "one embodiment", and "one implementation" mean that specific features, structures, materials, or characteristics described in the embodiment or implementation are included in at least one embodiment or implementation of the present disclosure. In this description, schematic descriptions of these terms do not necessarily refer to the same embodiment or implementation. Moreover, the described specific features, structures, materials, or characteristics may be combined in any suitable manner in one or more embodiments or implementations.

The following provides a detailed description of the present disclosure with reference to the accompanying drawings.

To solve the above technical problems, as shown in FIGS. 1-8, an embodiment of the present disclosure provides a vehicle pet pad. The vehicle pet pad includes a first pad 1 and a second pad 2. The first pad 1 includes a base pad 13, a first side pad 11, and a second side pad 12. Each of the first side pad 11 and the second side pad 12 is bendable relative to the base pad 13 to form an enclosure structure 6. The enclosure structure 6 is U-shaped or approximately U-shaped. One usage scenario involves placing the base pad 13 on a back seat of a vehicle, with the first side pad 11 close to a backrest of a front seat and the second side pad 12 close to a backrest of a rear seat of the vehicle. It should be understood that the vehicle pet pad may also be placed on the front seat for use. The enclosure structure 6 includes a first side edge 111, a second side edge 121, and a third side edge 131. The first side edge 111, the second side edge 121, and the third side edge 131 cooperatively define a first edge opening 7. The first edge opening 7 faces a vehicle door, providing a passage for pets to enter or exit. The second pad 2 is arranged on one of the first side edge 111, the second side edge 121, and the third side edge 131 and can be detachably connected to another one or two of the first side edge 111, the second side edge 121, and the third side edge 131, allowing users to bend or open the second pad 2 as needed. Once installed, the second pad 2 can effectively cover the first edge opening 7, preventing pets from escaping. When pets need to enter or exit, users can simply open the second pad 2. In some embodiments, the second pad 2 includes a first rigid pad 101, which provides sufficient support, eliminating the need for straps 5 to hang the second pad 2 on a door handle of the vehicle or attach the second pad 2 to the vehicle window. Thus, the vehicle pet pad provided in the present disclosure facilitates pet entry and exit and does not obstruct pet's view of scenery outside vehicle window.

Figure 2:
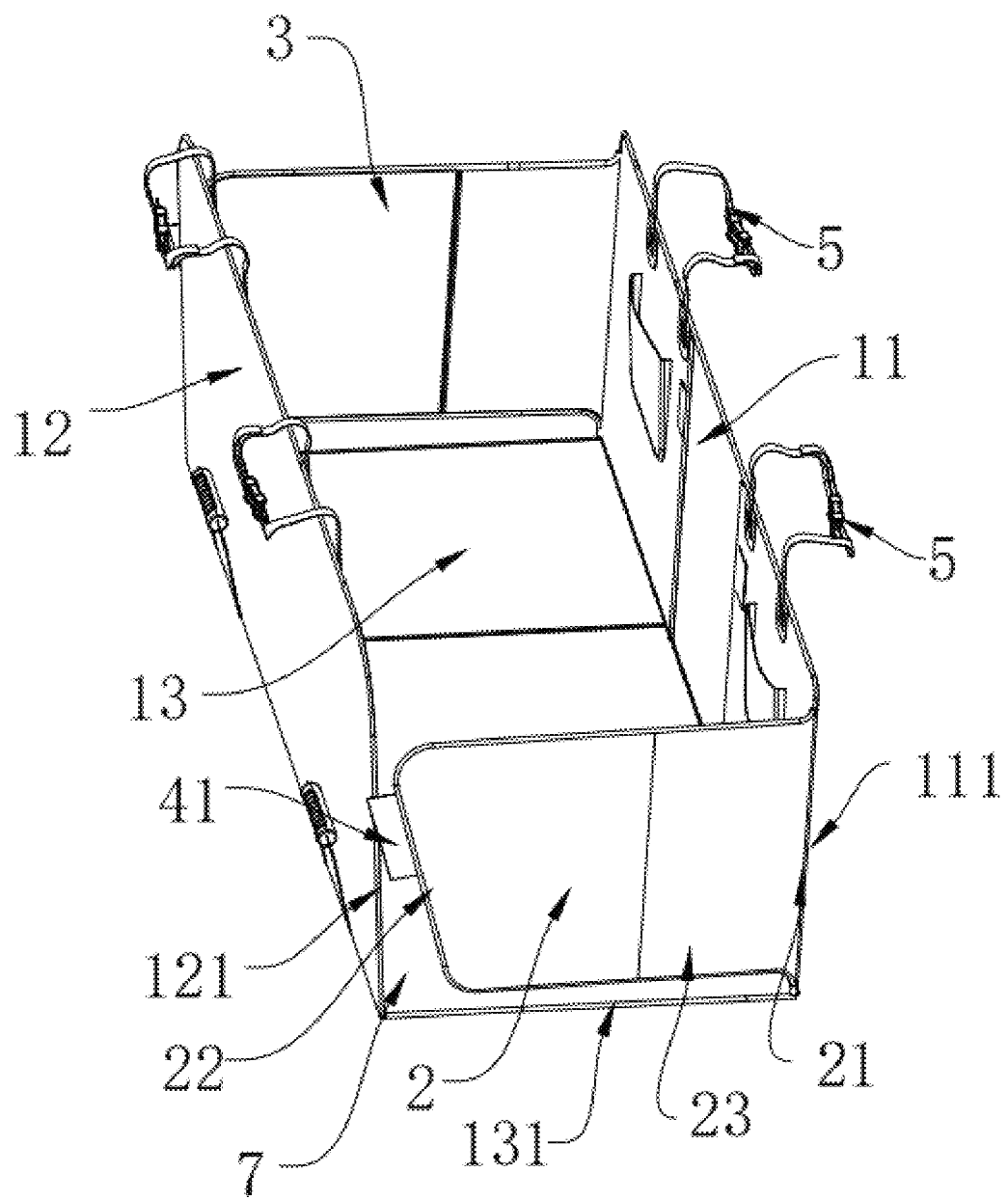
FIG. 2 is a first structural view of the vehicle pet pad in a usage state according to embodiments of the present disclosure.
Figure 3:
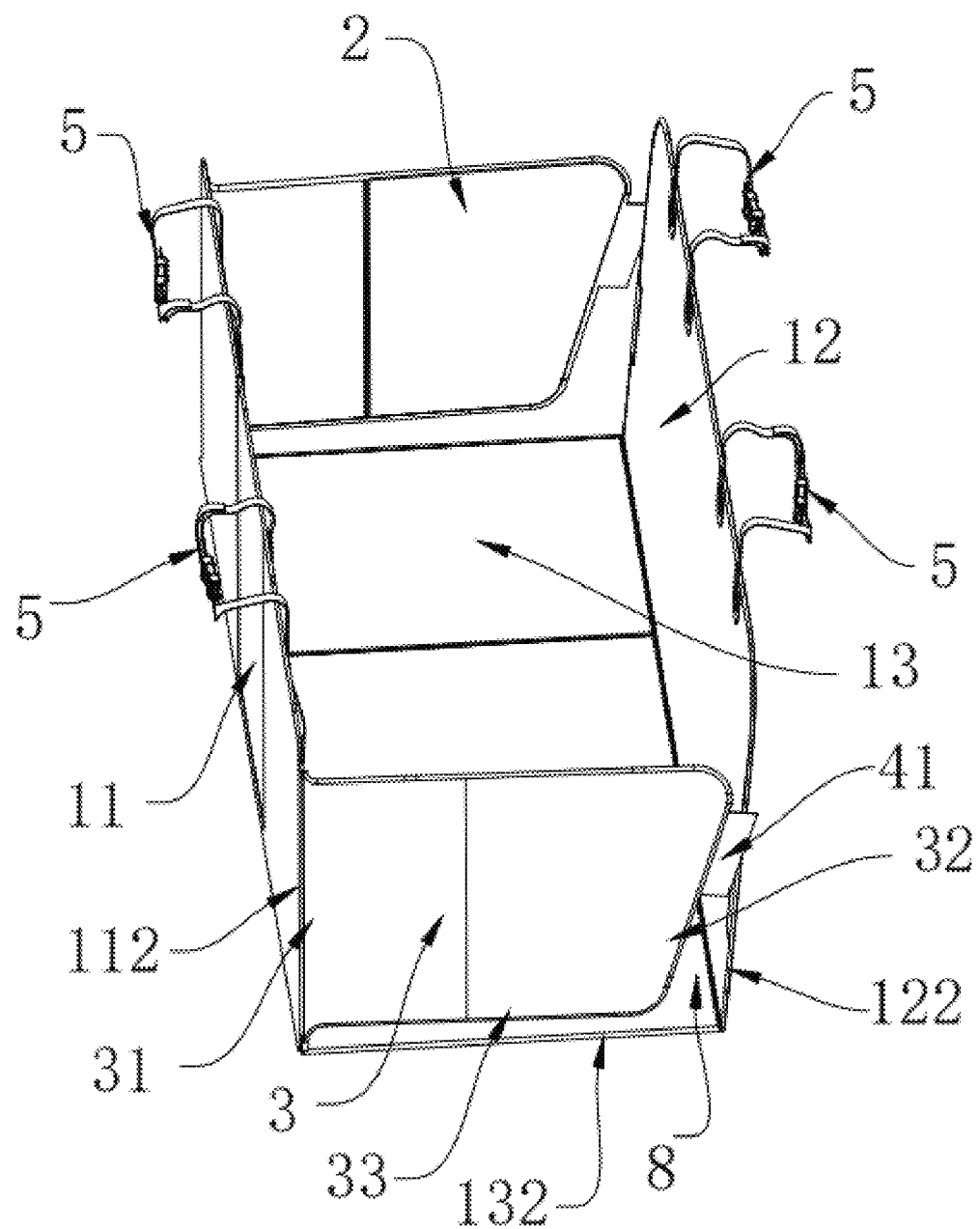
FIG. 3 is a second structural view of the vehicle pet pad in the usage state according to embodiments of the present disclosure.

In one embodiment of the present disclosure, as shown in FIGS. 1-2, the second pad 2 is connected to the first side edge 111. The second pad 2 can be directly sewed or adhered to the first side edge 111. Alternatively, the second pad 2 may include a first pad cloth 91, which is connected to the first side edge 111, and the first rigid pad 101 is arranged in the first pad cloth 91, thereby positioning the first rigid pad 101 on the first side edge 111. When bent along the first side edge 111, the first rigid pad 101 extends along a width direction of the base pad 13, effectively covering and blocking the first edge opening 7, ensuring that the second pad 2 and the enclosure structure 6 cooperatively form a relatively stable space, preventing pets from escaping through the first edge opening 7 and protecting the vehicle door from scratches by the pets.

In one embodiment of the present disclosure, as shown in FIGS. 1-2, second pad 2 includes a first edge 21, a second edge 22, and a third edge 23. The first edge 21 is connected to the first side edge 111. When the second pad 2 is bent along the first side edge 111, the second edge 22 is close to the second side edge 121, and the third edge 23 is close to the third side edge 131, thereby covering the first edge opening 7. The second edge 22 may be detachably connected to the second side edge 121; alternatively or additionally, the third edge 23 may be detachably connected to the third side edge 131. For example, a connection structure 4 may be arranged between the second edge 22 and the second side edge 121; alternatively or additionally, the connection structure 4 may be arranged between the third edge 23 and the third side edge 131. When the second pad 2 is bent, the connection structure 4 allows for installation or opening of the second pad 2. Users can quickly install the second pad 2 as needed to effectively cover the first edge opening 7, ensuring pet safety during vehicle rides. Similarly, when pets need to enter or exit, users can easily open the second pad 2 using the connection structure 4, providing unobstructed access for the pets.

Figure 4:
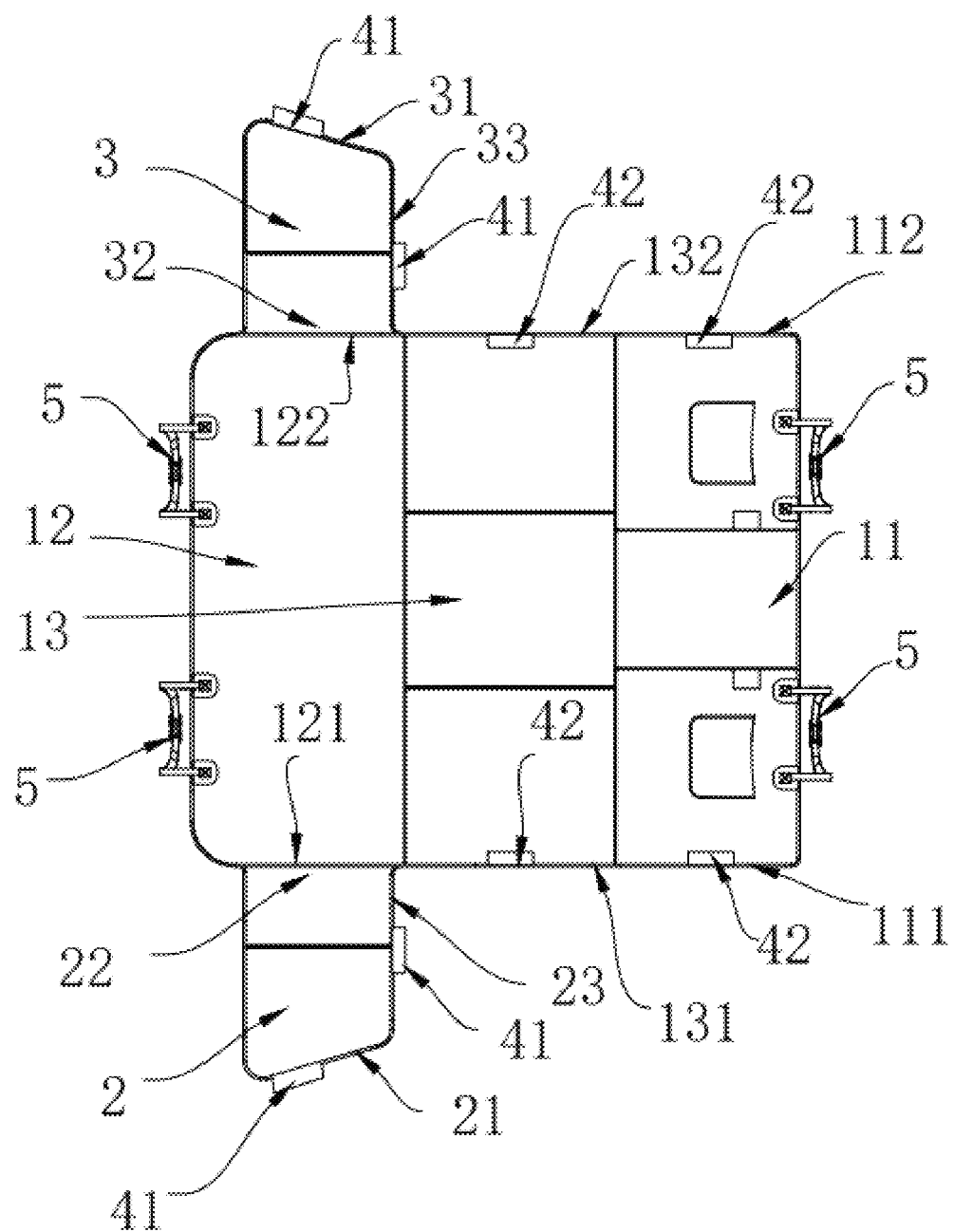
FIG. 4 is another structural view of the vehicle pet pad in the flat state according to embodiments of the present disclosure.
Figure 5:
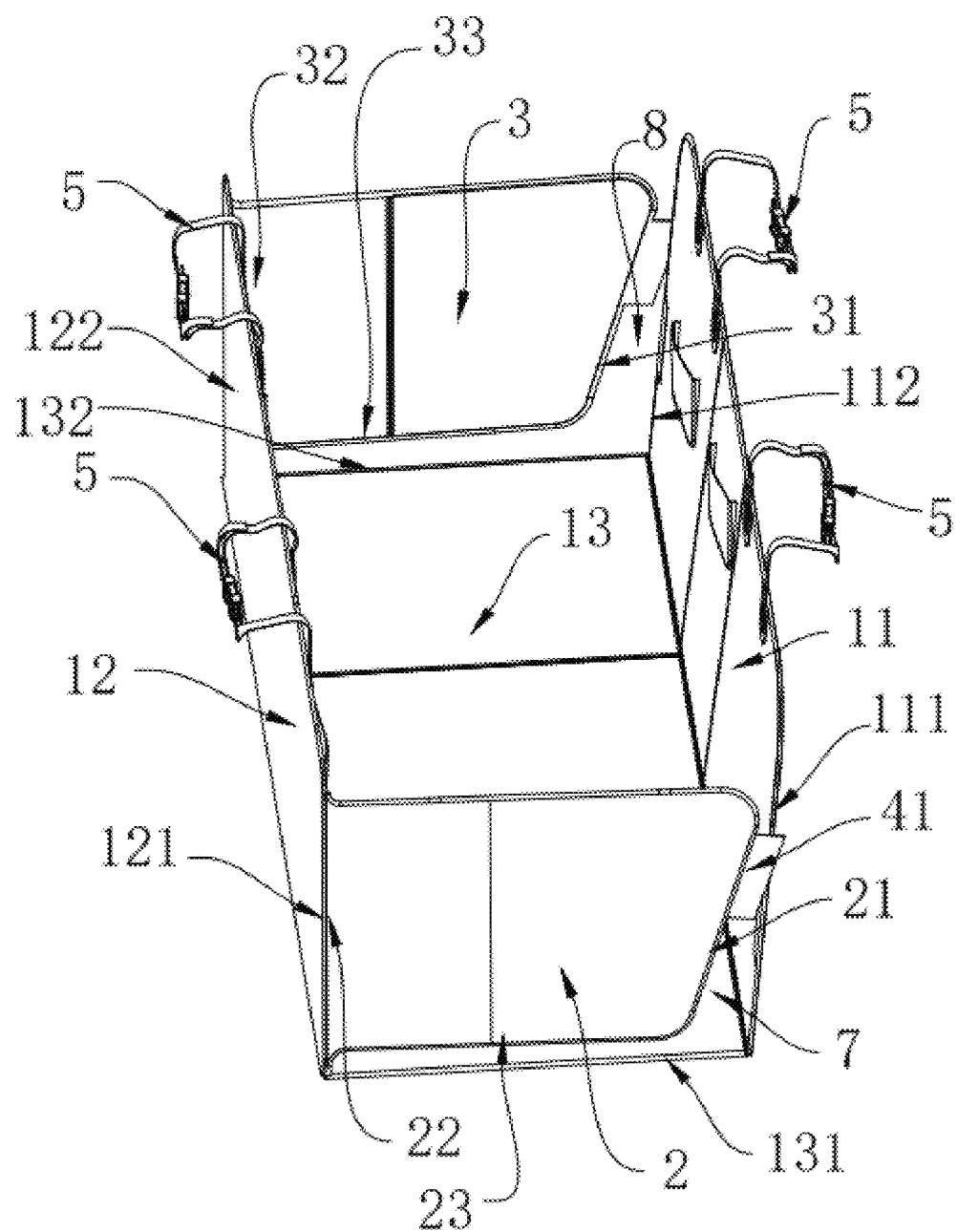
FIG. 5 is another structural view of the vehicle pet pad in the usage state according to embodiments of the present disclosure.

In another embodiment of the present disclosure, as shown in FIGS. 4-5, the second pad 2 is connected to the second side edge 121. Similar to the previous embodiment, the first rigid pad 101 may be sewed or adhered directly to the second side edge 121, or the first rigid pad 101 may be arranged in a first pad cloth 91 connected to the second side edge 121. When bent along the second side edge 121, the first rigid pad 101 extends along the width direction of the base pad 13, effectively covering and blocking the first edge opening 7.

In one embodiment of the present disclosure, as shown in FIGS. 4 and 5, the second pad 2 includes a first edge 21, a second edge 22, and a third edge 23. The second edge 22 connected to the second side edge 121. When the second pad 2 is bent along the second side edge 121, the first edge 21 is close to the first side edge 111, and the third edge 23 is close to the third side edge 131, thereby covering the first edge opening 7. The first edge 21 can be detachably connected to the first side edge 111; alternatively or additionally, the third edge 23 can be detachably connected to the third side edge 131. For example, a connection structure 4 may be arranged between the first edge 21 and the first side edge 111; alternatively or additionally, the connection structure 4 may be arranged between the third edge 23 and the third side edge 131. When the first rigid pad 101 is bent, the connection structure 4 allows for installation or opening of the second pad 2. Users can quickly install the second pad 2 as needed to effectively cover the first edge opening 7. Similarly, when pets need to enter or exit, users can easily open the second pad 2 using the connection structure 4.

Figure 6:
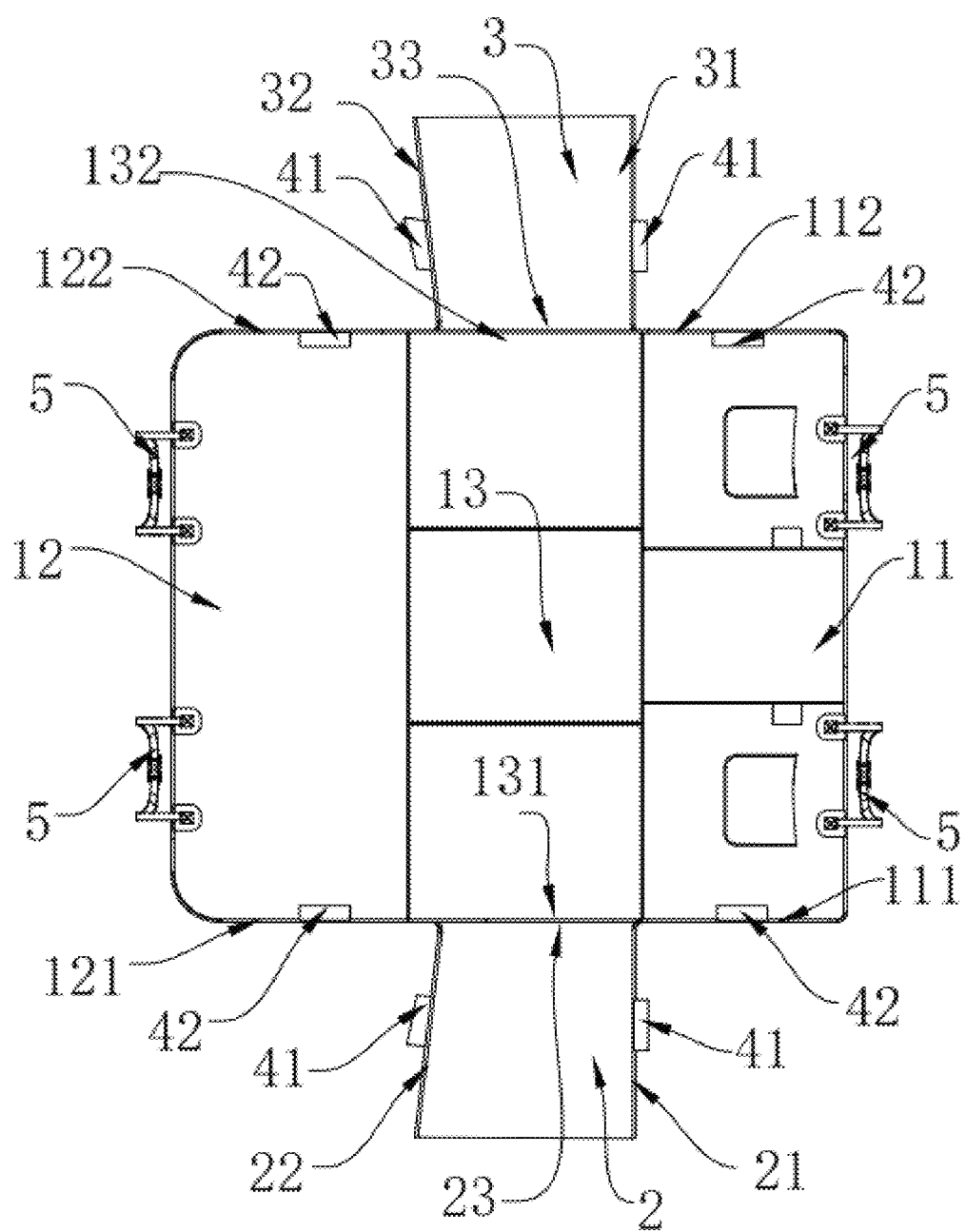
FIG. 6 is a further another structural view of the vehicle pet pad in the flat state according to embodiments of the present disclosure.
Figure 7:
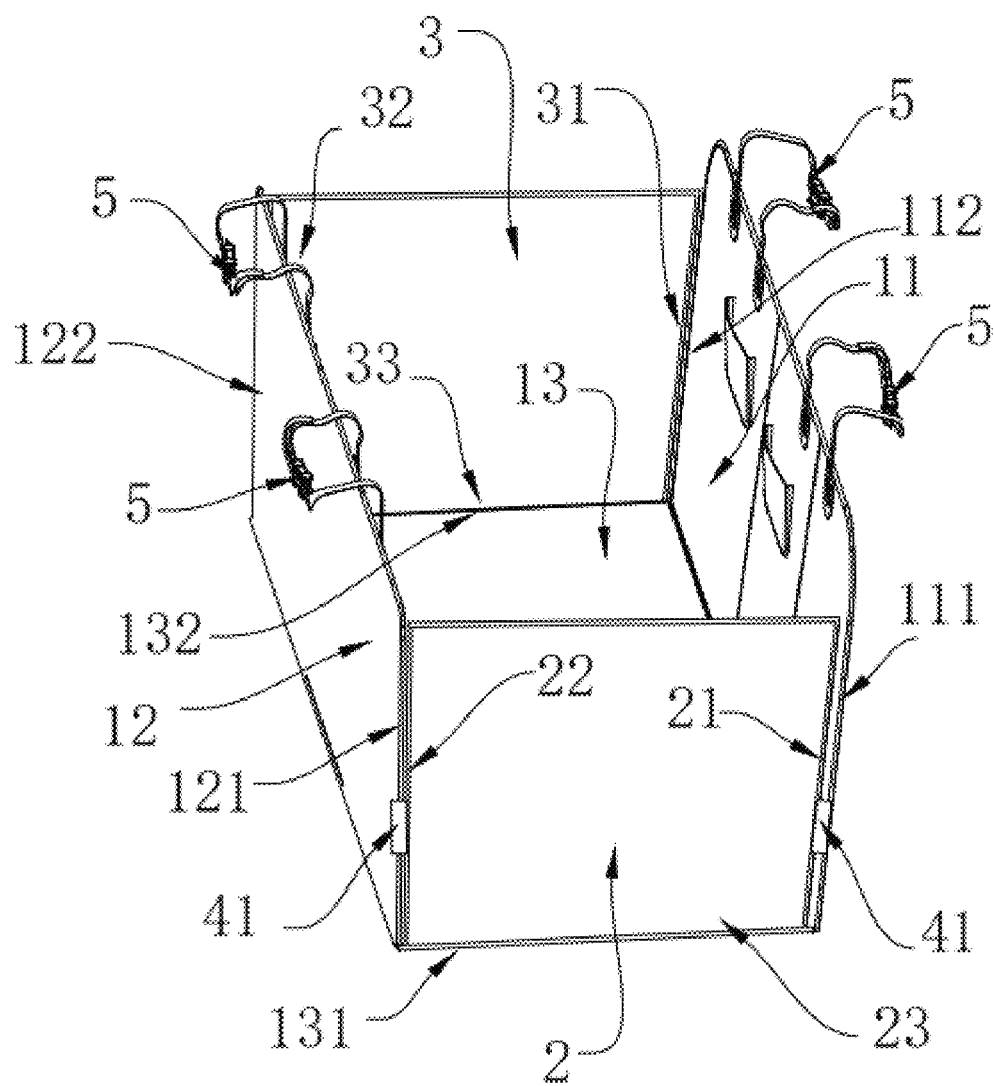
FIG. 7 is a further another structural view of the vehicle pet pad in the usage state according to embodiments of the present disclosure.

In one embodiment of the present disclosure, as shown in FIGS. 6 and 7, the second pad 2 is arranged on the third side edge 131. Similar to the previous embodiments, the first rigid pad 101 may be sewed or adhered directly to the third side edge 131, or the first rigid pad 101 may be arranged in a first pad cloth 91 connected to the third side edge 131. When bent upward along the third side edge 131, the first rigid pad 101 extends along a height direction of the first side pad 11 and the second side pad 12, effectively covering and blocking the first edge opening 7.

In one embodiment of the present disclosure, as shown in FIGS. 6 and 7, the second pad 2 includes a first edge 21, a second edge 22, and a third edge 23. The third edge 23 is connected to the third side edge 131. When the second pad 2 is bent along the third side edge 131, it folds up, the first edge 21 is close to the first side edge 111, and the second edge 22 is close to the second side edge 121, thereby blocking the first edge opening 7. The first edge 21 can be detachably connected to the first side edge 111; alternatively or additionally, the second edge 22 can be detachably connected to the second side edge 121. For example, a connection structure 4 may be arranged between the first edge 21 and the first side edge 111: alternatively or additionally, the connection structure 4 may be arranged between the second edge 22 and the second side edge 121. When the first rigid pad 101 is bent, the connection structure 4 allows for installation or opening of the second pad 2. Users can quickly install the second pad 2 as needed to effectively cover the first edge opening 7. Similarly, when pets need to enter or exit, users can easily open the second pad 2 using the connection structure 4.

In one embodiment of the present disclosure, as shown in FIG. 2, the first edge opening 7 faces the vehicle door, allowing pets to easily pass through the first edge opening 7 when entering or exiting the vehicle. While the second pad 2 operates independently of the vehicle door. The second pad 2 is neither hung on a door handle on a top of the vehicle door with straps nor attached to the vehicle door with hook-and-loop fasteners or other means. In other words, the second pad 2 is not connected to or dependent on the vehicle door, but remains stable and independent whether the vehicle door is open or closed.

In one embodiment of the present disclosure, as shown in FIGS. 1-7, the vehicle pet pad further includes at least one connection structure 4. The at least one connection structure 4 is configured to flexibly connection and detachment of the second pad 2 and the first pad 1. Specifically, each of the at least one connection structure 4 includes a first connector 41 and a second connector 42. The first connector 41 is arranged on the second pad 2, and the second connector 42 is correspondingly arranged on the enclosure structure 6, optionally on the first side edge 111, the second side edge 121, or the third side edge 131. In this way, the second pad 2 is allowed to be connected to any side edge of the first pad 1 as needed, enabling the covering or opening of the first edge opening 7.

In one embodiment of the present disclosure, as shown in FIG. 6, the connection structure 4 may be a hook-and-loop fastener, zipper, strap, or buckle. When the connection structure 4 is a hook-and-loop fastener, one of the first connector 41 and the second connector 42 is a hook side of the hook-and-loop fastener, and the other of the first connector 41 and the second connector 42 is a loop side of the hook-and-loop fastener. When the connection structure 4 is a zipper, each of the first connector 41 and the second connector 42 is a set of teeth. When the connection structure 4 is a strap, one of the first connector 41 and the second connector 42 is a strap body of the strap, and the other of the first connector 41 and the second connector 42 is a fastener of the strap. The fastener may be implemented as either a locking tooth or compression member for fastening the strap body. When the connection structure 4 is a buckle, one of the first connector 41 and the second connector 42 is a ring body, and the other of the first connector 41 and the second connector 42 is a clasp. It should be understood that the connection structure 4 may be implemented in various ways depending on the specific requirements of the vehicle pet pad, as long as it enables detachable connection, and is not limited to the examples provided here.

In one embodiment of the present disclosure, as shown in FIGS. 1 and 3-7, optionally, the third pad 3 may be implemented in the same way as in the related art, such as hanging the third pad 3 on the door handle with a strap 5, allowing pets to enter and exit through the door opposite the second pad 2. Preferably, the third pad 3 may also be implemented in the same way as the second pad 2, facilitating pet entry and exit through another door. In this case, the enclosure structure 6 further includes a fourth side edge 112, a fifth side edge 122, and a sixth side edge 132. The fourth side edge 112 is located at an end of the first side pad 11, and the first side edge 111 is located at the other end of the first side pad 11. The second side edge 121 is located at an end of the second side pad 12, and the fifth side edge 122 is located at the other end of the second side pad 12. The third side edge 131 is located at an end of the base pad 13, and the sixth side edge 132 is located at the other end of the base pad 13. The third pad 3 is arranged on one of the fourth side edge 112, the fifth side edge 122, and the sixth side edge 132 and can be detachably connected to another one or two of the fourth side edge 112, the fifth side edge 122, and the sixth side edge 132. In this way, users are allowed to bend or open the third pad 3 as needed, facilitating pet entry and exit.

In one embodiment of the present disclosure, as shown in FIGS. 1 and 3-7, the second pad 2 is arranged at one end of the enclosure structure 6, and the third pad 3 is arranged at the other end of the enclosure structure 6. The second pad 2 and the third pad 3 are symmetrical in shape, size, and position, ensuring consistency in structure and functionality of the vehicle pet pad on both sides, facilitating manufacturing and production of the vehicle pet pad.

In one embodiment of the present disclosure, as shown in FIG. 2, an area of the base pad 13 is larger than a seating area of a vehicle seat. When the base pad 13 is placed on the vehicle seat, at least a portion of the base pad 13 extends beyond the vehicle seat. The base pad 13 includes a third rigid pad 103. The third rigid pad 103 provides high support and durability, capable of bearing the pet without deformation. The portion of the base pad 13 extending beyond the vehicle seat can serve as a step or support for the pets, providing the pets with additional space for movement.

In one embodiment of the present disclosure, as shown in FIG. 2, the area of the base pad 13 is designed to cover a seat surface and a rear gap. Particularly, the area of the base pad (13) is the same as or approximately the same as a sum of an area of the vehicle seat and an area of a rear gap of the vehicle seat. The rear gap of the vehicle is defined between the backrest of the front seat and a cushion of the rear seat. In this case, an area of the portion of the base pad 13 extending beyond the vehicle seat is maximized, providing the pets with the largest space for movement. Additionally, this design allows the second side pad 12 to naturally fit against the backrest of the front seat, thereby facilitating connection between the second side pad 12 and the front seat.

Figure 8:
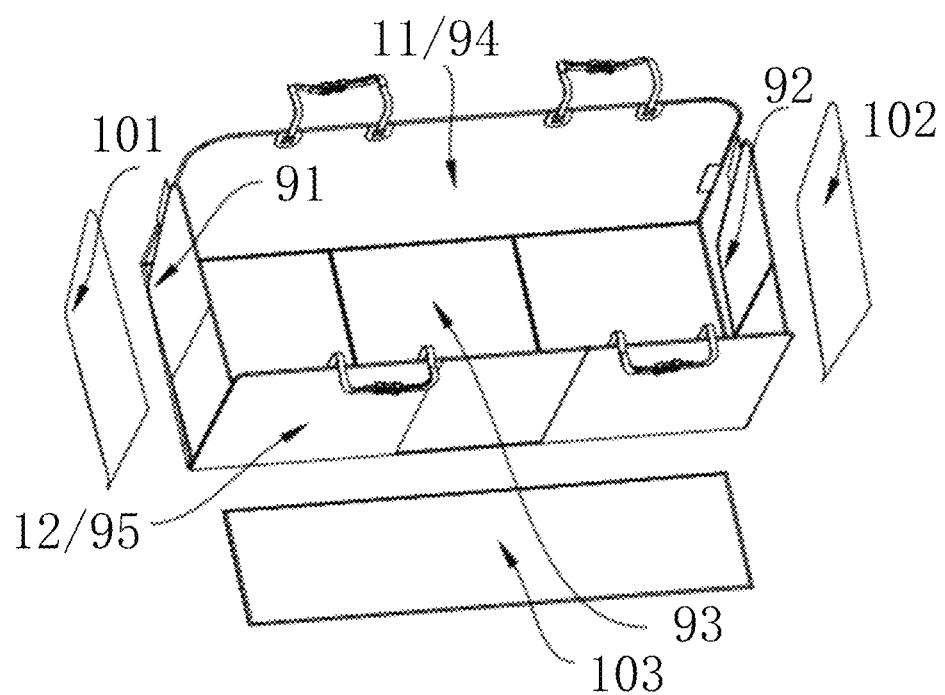
FIG. 8 is an exploded view of the vehicle pet pad according to embodiments of the present disclosure.

In one embodiment of the present disclosure, as shown in FIGS. 2 and 8, the second pad 2 includes a first rigid pad 101 and a first pad cloth 91. The base pad 13 includes a third rigid pad 103. The first rigid pad 101 is detachably arranged in the first pad cloth 91. In this way, users are allowed to easily install or remove the first rigid pad 101 for cleaning and maintenance. Users can also choose rigid pads of different hardness levels based on the pet's size and usage scenario. The first pad cloth 91 is typically made of a waterproof and wear-resistant material, such as Oxford cloth or nylon, to prevent pet paw prints, fur, and stains from contaminating the vehicle seats and doors.

In one embodiment of the present disclosure, as shown in FIGS. 2 and 8, the second pad 2 includes a first rigid pad 101 and a first pad cloth 91, the third pad 3 includes a second rigid pad 102 and a second cloth 92, and the base pad 13 includes a third rigid pad 103 and a third pad cloth 93, facilitating cleaning and maintenance for users.

In one embodiment of the present disclosure, as shown in FIGS. 2 and 8, the first side pad 11 is configured as a fourth cloth 94, and the second side pad 12 is configured as a fifth pad cloth 95, and the first pad cloth 91, the second pad cloth 92, the third pad cloth 93, the fourth pad cloth 94, and the fifth pad cloth 95 are integrally formed as a one-piece structure, allowing users to clean the vehicle pet pad by wiping or removing and washing the entire cloth, reducing cleaning difficulties. Additionally, by simply bending the first side pad 11, second side pad 12, second pad 2, and third pad 3, the vehicle pet pad in a usage state can be easily formed, significantly simplifying user installation steps.

In one embodiment of the present disclosure, as shown in FIGS. 2 and 8, each of the first pad cloth 91, the second pad cloth 92, the third pad cloth 93, the fourth pad cloth 94, and the fifth pad cloth 95 is washable, allowing users to remove the rigid pads and wash the pad cloths when the vehicle pet pad becomes dirty.

In one embodiment of the present disclosure, as shown in FIG. 2, when the second side pad 12 is bent, the second side pad 12 is inclined, and an inclined angle of the second side pad 12 matches an inclined angle of the vehicle seat. Specifically, the inclined angle of the second side pad 12 is consistent with or the same as an inclined angle of the vehicle seat, ensuring a close fit against surface of the vehicle seat. In this way, the second side pad 12 can be prevented from shifting or loosening due to bumps or pet movement during driving. Additionally, the close fit provides a stable and safe environment for pets during vehicle rides. Additionally, the inclined design allows the vehicle pet pad to adapt to seat structures of different vehicle models.

Whether seat backrest is inclined or flat, the second side pad 12 can snugly fit the vehicle seat by adjusting the inclined angle of the second side pad 12, ensuring versatility and compatibility of the vehicle pet pad.

In one embodiment of the present disclosure, as shown in FIG. 2, the second edge 22 is inclined, and an inclined angle of the second edge 22 is the same as the inclined angle of the second side pad 12, ensuring a seamless fit and avoiding gaps caused by mismatched angles.

In one embodiment of the present disclosure, as shown in FIG. 2, each of the first side pad 11 and the second side pad 12 is arranged with a plurality of straps 5 for hanging on headrests of the vehicle seats. Connection between the headrests and the straps 5 are configured to secure each of the first side pad 11 and the second side pad 12 in a bent state. Particularly, each of the first side pad 11 and the second side pad 12 is arranged with two straps 5 for hanging on two headrests of the front seats or two headrests of the rear seats.

It should be noted that the above technical features can be combined in various ways to form additional embodiments not explicitly listed here, all of which fall within the scope of the present disclosure. Additionally, those skilled in the art can make improvements or modifications based on the above description, all of which should fall within the protection scope of the appended claims of the present disclosure.

What is claimed is:

1. A vehicle pet pad, comprising:
    a first pad, comprising a base pad, a first side pad, and a second side pad, wherein each of the first side pad and the second side pad is bendable relative to the base pad, and the first side pad, the second side pad, and the base pad are capable of forming an enclosure structure which is U-shaped or approximately U-shaped: the enclosure structure comprises a first side edge, a second side edge, and a third side edge, the first side edge, the second side edge, and the third side edge cooperatively define a first edge opening; and
    a second pad, connected to one of the first side edge, the second side edge, and the third side edge, detachably connected to another one or two of the first side edge, the second side edge, and the third side edge, configured to cover or open the first edge opening, and comprising a first rigid pad;
    wherein the second pad is connected to the first side edge;
    the second pad comprises a first edge, a second edge, and a third edge, the first edge is connected to the first side edge, and after the second pad is bent along the first side edge to cover the first edge opening, the second edge is close to the second side edge, and the third edge is close to the third side edge;
    at least one pair of edges selected from the group consisting of: (i) the second edge and the second side edge, and (ii) the third edge and the third side edge, are mutually detachably connected.

2. A vehicle pet pad, comprising:
    a first pad, comprising a base pad, a first side pad, and a second side pad, wherein each of the first side pad and the second side pad is bendable relative to the base pad, and the first side pad, the second side pad, and the base pad are capable of forming an enclosure structure which is U-shaped or approximately U-shaped: the enclosure structure comprises a first side edge, a second side edge, and a third side edge, the first side edge, the second side edge, and the third side edge cooperatively define a first edge opening; and
    a second pad, rotatably connected to one of the first side edge, the second side edge, and the third side edge, detachably connected to another one or two of the first side edge, the second side edge, and the third side edge, configured to cover or open the first edge opening, and comprising a first rigid pad;
    wherein the second pad is connected to the third side edge, and when the second pad is bent upward, the second pad covers the first edge opening;
    the second pad comprises a first edge, a second edge, and a third edge, the third edge is connected to the third side edge, and after the first rigid pad is bent upward along the third side edge for covering the first edge opening, the first edge is close to the first side edge, the second edge is close to the second side edge;
    at least one pair of edges selected from the group consisting of: (i) the first edge and the first side edge, and (ii) the second edge and the second side edge, are mutually detachably connected.

3. The vehicle pet pad as claimed in claim 1, wherein the first edge opening is arranged to face a vehicle door, and the second pad is independently arranged from the vehicle door.

4. The vehicle pet pad as claimed in claim 1, further comprising a connection structure, wherein the connection structure comprises a first connector and a second connector, the first connector and the second connector are detachably connected with each other, the first connector is arranged on the second pad, and the second connector is arranged on the first side edge, the second side edge, or the third side edge corresponding to the first connector.

5. The vehicle pet pad as claimed in claim 4, wherein the connection structure is a hook-and-loop fastener, zipper, strap, or buckle.

6. A vehicle pet pad, comprising:
    a first pad, comprising a base pad, a first side pad, and a second side pad, wherein each of the first side pad and the second side pad is bendable relative to the base pad, and the first side pad, the second side pad, and the base pad are capable of forming an enclosure structure which is U-shaped or approximately U-shaped; the enclosure structure comprises a first side edge, a second side edge, and a third side edge, the first side edge, the second side edge, and the third side edge cooperatively define a first edge opening; and
    a second pad, rotatably connected to one of the first side edge, the second side edge, and the third side edge, detachably connected to another one or two of the first side edge, the second side edge, and the third side edge, configured to cover or open the first edge opening, and comprising a first rigid pad;
    a third pad, wherein the enclosure structure further comprises a fourth side edge, a fifth side edge, and a sixth side edge, and the fourth side edge, the fifth side edge, and the sixth side edge cooperatively define a second edge opening;
    the third pad is arranged on one of the fourth side edge, the fifth side edge, and the sixth side edge, and detachably connected to another one or two of the fourth side edge, the fifth side edge, and the sixth side edge, configured to cover or open the second edge opening, and comprising a second rigid pad.

7. The vehicle pet pad as claimed in claim 6, wherein the third pad and the second pad are symmetrically arranged.

8. The vehicle pet pad as claimed in claim 6, wherein an area of the base pad is larger than a seating area of a vehicle seat, and when the base pad is placed on the vehicle seat, at least a portion of the base pad extends beyond the vehicle seat;

the base pad comprises a third rigid pad.

9. The vehicle pet pad as claimed in claim 8, wherein the area of the base pad is the same as or approximately the same as a sum of an area of the vehicle seat and an area of a rear gap of the vehicle seat.

10. The vehicle pet pad as claimed in claim 1, wherein the second pad further comprises a first pad cloth, and the first rigid pad is detachably arranged in the first pad cloth.

11. The vehicle pet pad as claimed in claim 6, wherein the second pad further comprise a first pad cloth, the third pad further comprise a second pad cloth, and the base pad comprises a third rigid pad and a third pad cloth:

the first rigid pad is detachably arranged in the first pad cloth, the second rigid pad is detachably arranged in the second pad cloth, and the third rigid pad is detachably arranged in the third pad cloth.

12. The vehicle pet pad as claimed in claim 11, wherein the first side pad is configured as a fourth pad cloth, the second side pad is configured as a fifth pad cloth, and the first pad cloth, the second pad cloth, the third pad cloth, the fourth pad cloth, and the fifth pad cloth are integrally formed as one-piece structure.

13. The vehicle pet pad as claimed in claim 12, wherein each of the first pad cloth, the second pad cloth, the third pad cloth, the fourth pad cloth, and the fifth pad cloth is washable.

14. The vehicle pet pad as claimed in claim 1, wherein when the second side pad is bent, the second side pad is inclined, an inclined angle of the second side pad is the same as an inclined angle of a vehicle seat, and the second side pad fits against the vehicle seat.

15. The vehicle pet pad as claimed in claim 14, wherein the second edge is inclined, and an inclined angle of the second edge is the same as the inclined angle of the second side pad.

16. The vehicle pet pad as claimed in claim 6, wherein the second pad comprises a plurality of first portions, and the plurality of first portions are sequentially connected to each other along a length direction of the second pad:

the third pad comprises a plurality of second portions, and the plurality of second portions are sequentially connected to each other along a length direction of the third pad.

17. The vehicle pet pad as claimed in claim 6, wherein the base pad comprises a plurality of first portions, and the plurality of first portions are sequentially connected to each other along a length direction of the base pad:

the first side pad comprises a plurality of second portions, and the plurality of second portions are sequentially connected to each other along a length direction of the first side pad.

18. The vehicle pet pad as claimed in claim 6, wherein the first side edge is located at an end of the first side pad, and the fourth side edge is located at the other end of the first side pad;

the second side edge is located at an end of the second side pad, and the fifth side edge is located at the other end of the second side pad;

the third side edge is located at an end of the base pad, and the sixth side edge is located at the other end of the base pad.

19. The vehicle pet pad as claimed in claim 6, wherein each of the first side pad and the second side pad is arranged with a plurality of straps, and the plurality of straps are arranged spaced from each other along a length direction of a respective one of the first side pad and the second side pad.

\* \* \* \* \*